C. STEWART.
LUBRICATOR.
APPLICATION FILED FEB. 18, 1908.
994,284.
Patented June 6, 1911.
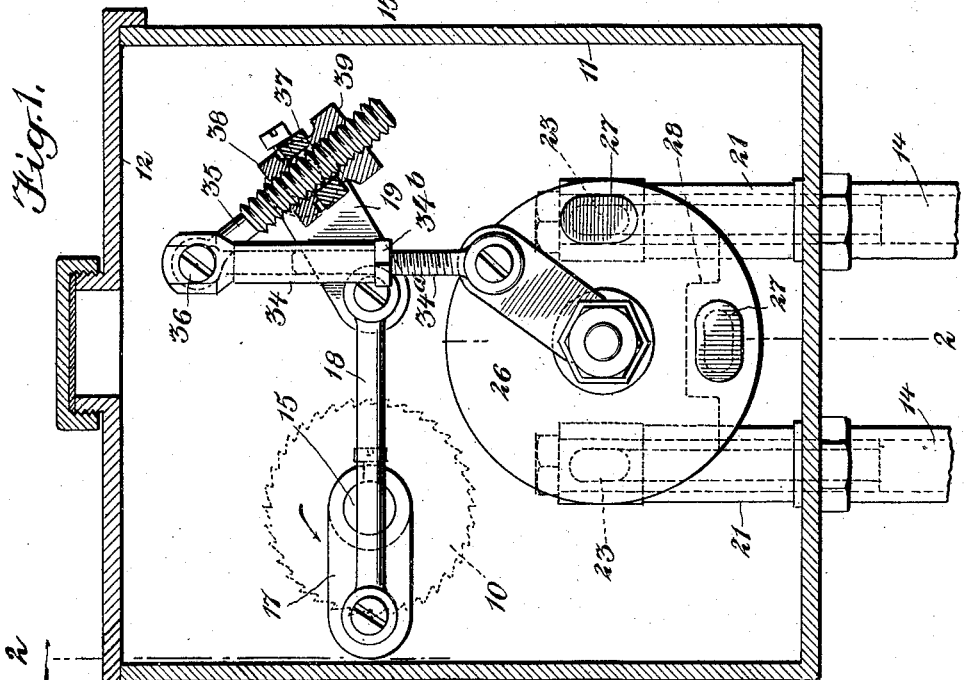
Witnesses
Geo. N. Naylor
C. J. Horten
Inventor
Charles Stewart
By his Attorney
Isaac B. Owens

UNITED STATES PATENT OFFICE.

CHARLES STEWART, OF NEW YORK, N. Y.

LUBRICATOR.

994,284.   Specification of Letters Patent.   Patented June 6, 1911.

Application filed February 18, 1908. Serial No. 416,447.

*To all whom it may concern:*

Be it known that I, CHARLES STEWART, of the city of New York, borough of Brooklyn, county of Kings, and State of New York, have invented certain new and useful Improvements in Lubricators, of which the following is a full, clear, and exact specification, such as will enable others skilled in the art to which it appertains to make and use the same.

My invention relates to what are known as mechanical lubricators, in which measured quantities of the lubricant are periodically delivered, and it resides in certain special combinations and construction of parts all of which will be fully set forth hereinafter and particularly pointed out in the claims.

Reference is had to the accompanying drawings, in which,

Figure 1 is a sectional elevation on the line 1—1 of Fig. 2; and Fig. 2 is a sectional elevation on the line 2—2 of Fig. 1.

The apparatus is driven from the engine or other machine to which it may be connected through the medium of the usual pawl and ratchet devices which I have not here illustrated in detail, 10 representing the ratchet wheel. With the exception of the pawl and ratchet driven device all of the working parts of the invention are incased by an oil tank 11 fitted at its top with a cover 12 of any desired form and having two oil discharge pipes 14 passing from its bottom to carry the lubricant to the point of use. The ratchet 10 is fastened on a shaft 15 which is mounted in a suitable box 16 in the side of the oil tank 11 and provided within the tank with a crank 17. To this crank is articulated a connecting rod 18 which is also joined to a crank 19 on a rock shaft 20 mounted horizontally in the tank 11. The proportions of the cranks 17 and 19 are such that progressive rotation of the shaft 15 will impart a rocking motion to the shaft 20.

Two stand pipes 21 are mounted on the bottom of the tank within the same and support a plate 22. This lies in a vertical plane and has openings 23 therein passing horizontally into communication with the interiors of the stand pipes 21. Excepting for these openings the upper ends of the pipes 21 are closed. The pipes 21 and plate 22 constitute an outlet means for the lubricator and, broadly, are so referred to in the claims though of course equivalent outlet means may be substituted. The plate 22 rigidly supports a stud 24 and on this stud is mounted the hub 25 of a rocker plate 26. The rocker plate carries two cups 27. These cups, as shown best in Fig. 2, open at the ends adjacent to the stand pipes 21, and the plate 22 is provided at its lower portion with a notch 28 which exposes the cups when the same are moved down as shown with respect to one of the cups in the drawings. As the plate 26 rocks it alternately brings the cups 27 opposite the opening or notch 28 in the plate 22 and opposite the respective openings 23 in the plate 22. When, therefore, one of the cups is moved down and exposed at the opening 28 it fills with oil and when this cup is moved up to register with its corresponding opening 23, the oil is delivered from the cup into the pipe. One cup, therefore, is filling while the other is discharging its contents, and it will be seen that by controlling the motion of the plate 26 and its attached cups the cups may be made to register to a greater or less extent with the openings 23, thus discharging a greater or less quantity of oil as will be more fully set forth hereinafter.

The hub 25 of the plate 26 is engaged by a clutch collar 29 fastened to a crank 30 loosely mounted on the stud 24 and held by nuts 31.

32 indicates a washer surrounding the clutch collar 29, and 33 a spring which bears between the washer and the disk 26. By adjusting the nuts 31, the tension of the spring 33 may be controlled and this spring serves to press the disk 26 against the disk 22, the tension of the spring controlling the degree of pressure exerted by the one plate on the other.

The crank arm 30 is joined by a connecting rod 34, 34ª with the crank 35 on the shaft 20. The connecting rod 34, 34ª is in two sections screw-threaded together and held by a nut 34ᵇ. The upper end of the connecting rod is joined to the crank 35 by means of a screw 36, and by disconnecting this screw the part 34 may be readily turned on the rod 34ª thus lengthening or shortening the connecting rod as desired. After the necessary adjustment has been brought about the screw 36 may be returned and the nut 34ᵇ screwed up against the end of the section 34. The crank 35 is passed loosely through a flattened portion 37 of the shaft 20 and is adjustably held by nuts 38 and 39. These various adjustments are important since through their medium the stroke of the plate 26 may be varied within a wide range. Thus, by varying the length of the crank arm 35 beyond the shaft 20 the stroke of the plate 26 may be increased or diminished thus regulating the flow from both pipes 21 uniformly, and by changing the length of the connecting rod 34, 34ᵃ the disk 26 may be controlled so that one cup will register with its orifice 23 more fully than the other causing the lubricant to be fed through one stand-pipe faster than through the other.

The device is intended for use in connection with machinery of all sorts particularly in engine work for lubricating the bearings of the crank shaft and their moving parts. Any necessary number of the lubricators may be used and all of them may be driven from one reach rod (not shown) or by other convenient means. The discharge pipes 14 may of course be made any length desired to transmit the oil and if desired a number of measuring cups, disks and other appurtenant parts may be inclosed in a single tank and operated from a common prime mover shaft such as the shaft 15. Various other similar changes may be made in the details of the embodiment of the device without departing from the spirit of my invention.

Having thus described my invention, what I claim as new and desire to secure by Letters Patent of the United States is:

1. A lubricator, comprising a tank, a plurality of outlet pipes arranged vertically therein and each provided with an orifice, a vertically-arranged plate associated with said pipes and provided with apertures which register with the orifices of said pipes, a rocking member bearing against said plate and normally closing the apertures thereof, a plurality of cups carried by said rocking member and adapted periodically to register with said apertures and orifices to admit measured quantities of the lubricant thereto, and means for rocking said member.

2. A lubricator, comprising a tank, a plurality of outlet pipes arranged vertically therein and each provided with an orifice, a vertically-arranged plate associated with said pipes and provided with apertures which register with the orifices of said pipes, a rocking member bearing against said plate and normally closing the apertures thereof, a plurality of cups carried by said rocking member and adapted periodically to register with said apertures and orifices to admit measured quantities of the lubricant thereto, a rock shaft, an adjustable crank connected thereto, and a connecting rod interposed between said crank and the movable member, whereby the latter is actuated from said rock shaft.

3. A lubricator, comprising a tank, a plurality of outlet pipes standing therein and each provided with an orifice, a rocking member, a plurality of cups carried by the rocking member and respectively adapted periodically to register with the orifices of the outlet pipes to admit measured quantities of the lubricant thereto, means for rocking said member, and a closure for the cups interposed between said rocking member and the outlet pipes and provided with apertures which register with the orifices of the outlet pipes, said closure having an opening at its lower portion to expose the cups and allow the same to fill with the lubricant.

4. A lubricator having a tank with two outlet pipes standing therein, a rocking member sliding against the surfaces surrounding the openings of said pipes normally to close the same, two cups carried by the rocking member and respectively adapted periodically to register with the openings of the outlet pipes to admit measured quantities of the lubricant thereto, a stud on which the rocking member is mounted, a hub attached to the rocking member, a crank having a collar connected to rotate with the hub, means for adjusting the collar toward and from the hub, a spring acting between the collar and rocking member to hold the latter in place and means for driving the crank.

5. A lubricator, comprising a tank, a plurality of outlet pipes standing therein and each provided with an orifice, a rocking member, a plurality of cups carried by the rocking member and respectively adapted periodically to register with the orifices of the outlet pipes to admit measured quantities of the lubricant thereto, means for rocking said member, a closure for the cups interposed between said rocking member and the outlet pipes and provided with apertures which register with the orifices of the outlet pipes, said closure having an opening at its lower portion to expose the cups and allow the same to fill with the lubricant, and means for yieldingly pressing said rocking member against the closure.

6. A lubricator having a tank with two outlet pipes standing therein, a rocking member sliding against the surfaces surmounting the openings of said pipes normally to close the same, two cups carried by the rocking member and respectively adapted periodically to register with the openings of the outlet pipes to admit measured quantities of the lubricant thereto, a stud on which the rocking member is mounted, a hub attached to the rocking member, a crank having a collar connected to rotate with the hub, means for adjusting the collar toward and from the hub, a spring acting between the collar and rocking member to hold the latter in place and means for driving the crank, consisting of an adjustable connecting rod articulated to the crank, a rock shaft, and an adjustable crank thereon to which the connecting rod is also joined.

7. In a lubricator, a tank having a plurality of outlets, a rocking member associated therewith, a plurality of cups carried by said member and arranged in angular relation to each other, whereby when one of said cups is discharging the lubricant into an outlet another is filling therewith, and means for alternately positioning the cups in filling and discharging positions.

8. A lubricator comprising a tank, a plurality of outlet pipes arranged therein, a plate associated with said pipes and provided with apertures which register with the orifices of said pipes, a movable member bearing against the said plate and normally closing the apertures thereof, and a plurality of cups carried by said member, and adapted periodically to register with said apertures to admit measured quantities of the lubricant thereto.

9. A lubricator comprising a tank, a plurality of outlet pipes each provided with an orifice, a movable member, a plurality of cups carried by said member and respectively adapted periodically to register with the orifices of the outlet pipes to admit measured quantities of the lubricant thereto, means of moving said member and a closure interposed between said members and pipes and provided with apertures registering with the orifices of the pipes, said closure permitting the exposure and filling of the cups with lubricant during a portion of their travel.

10. A lubricator comprising a tank, having a plurality of outlets, a movable member associated therewith, a plurality of cups carried by said member spaced apart whereby one of said cups is discharging the lubricant into an outlet, the other cup is filling with lubricant and means for alternately positioning the cups in filling and discharging position.

In testimony whereof I have signed my name to this specification in the presence of two subscribing witnesses.

CHARLES STEWART.

Witnesses:
ISAAC B. OWENS,
C. J. HORTON.

---

Copies of this patent may be obtained for five cents each, by addressing the "Commissioner of Patents, Washington, D. C."